(12) United States Patent  
Aoki

(10) Patent No.: US 6,817,254 B2
(45) Date of Patent: Nov. 16, 2004

(54) DIAGNOSTIC METHOD FOR A SEAT LOAD

(75) Inventor: Hiroshi Aoki, Tokyo (JP)

(73) Assignee: Takata Corporation, Tokyo (JP)

(*) Notice: Subject to any disclaimer, the term of this patent is extended or adjusted under 35 U.S.C. 154(b) by 138 days.

(21) Appl. No.: 10/219,244

(22) Filed: Aug. 16, 2002

(65) Prior Publication Data

US 2003/0051564 A1 Mar. 20, 2003

Related U.S. Application Data

(62) Division of application No. 09/500,230, filed on Feb. 8, 2000, now Pat. No. 6,546,817.

(30) Foreign Application Priority Data

Feb. 8, 1999 (JP) .............................. 11-29781

(51) Int. Cl.⁷ ................................. G01L 1/22
(52) U.S. Cl. ................................ 73/862.474
(58) Field of Search ............... 73/862.325, 862.046, 73/862.474, 862.627

(56) References Cited

U.S. PATENT DOCUMENTS

| | | |
|---|---|---|
| 3,916,173 A | 10/1975 | Williams, Jr. et al. .. 235/151.33 |
| 4,535,854 A | 8/1985 | Gard et al. ................. 177/1 |
| 4,804,052 A | 2/1989 | Griffen .................. 177/25.14 |
| 4,815,547 A | 3/1989 | Dillon et al. ............ 177/25.14 |
| 4,842,085 A | 6/1989 | Lang ....................... 177/164 |
| 4,909,338 A | 3/1990 | Vitunic et al. ............. 177/50 |
| 4,951,763 A | 8/1990 | Zimmerman et al. ...... 177/164 |
| 5,004,058 A | 4/1991 | Langford et al. ....... 177/25.13 |
| 5,076,375 A | 12/1991 | Dillon et al. .............. 177/45 |
| 5,287,748 A | 2/1994 | Talmadge .................. 73/769 |
| 5,396,439 A | 3/1995 | Yamada ................... 364/566 |
| 5,413,378 A | 5/1995 | Steffens, Jr. et al. ...... 280/735 |
| 5,810,392 A | 9/1998 | Gagnon ................... 280/735 |
| 5,837,946 A | 11/1998 | Johnson et al. ........... 177/136 |
| 6,201,480 B1 * | 3/2001 | Aoki ....................... 340/667 |
| 6,243,634 B1 * | 6/2001 | Oestreicher et al. ......... 701/45 |
| 6,356,200 B1 * | 3/2002 | Hamada et al. ........... 340/667 |

FOREIGN PATENT DOCUMENTS

| | | |
|---|---|---|
| EP | 0 721 099 | 12/1995 |
| GB | 2 250 345 | 6/1992 |
| GB | 2 221 039 | 1/1994 |
| JP | H06-58706 | 3/1994 |
| JP | 10-294112 | 11/1998 |
| WO | WO 98/22920 | 5/1998 |

* cited by examiner

Primary Examiner—Max Noori
(74) Attorney, Agent, or Firm—Foley & Lardner LLP

(57) ABSTRACT

To provide a diagnostic method of a seat load measuring apparatus for detecting an abnormality of the seat load measuring apparatus, outputs of load sensors 1R, 1L are inputted into a differential amplifier 4 through a multiplexer 3, converted into digital signals by a A/D converter 5, and then inputted into the MPU 6. An offset correction amount is added into the input of the differential amplifier 3 from the MPU 6 through a D/A converter 10. First, the output of the differential amplifier 4 is measured in a state in which no load is applied to a seat and a value thus measured is assumed as X1. After a predetermined load is applied to the seat, the output of the differential amplifier 4 is measured and a value thus measured is assumed as Y1. It is judged that a difference between X1 and Y1 is in a predetermined range between A1 and B1. When the difference between X1 and Y1 is not in the range between A1 and B1, an alarm indicating abnormality is emitted.

7 Claims, 8 Drawing Sheets

DIAGNOSTIC METHOD FOR A SEAT LOAD

This application is a Division of 09/500,230 filed Feb. 8, 2000, now U.S. Pat. No. 6,546,817.

FIELD OF THE INVENTION

The present invention relates to a method of diagnosing the state of a seat load measuring apparatus for measuring a load applied on a vehicle seat such as the weight of a passenger sitting thereon and thus detecting abnormalities.

BACKGROUND OF THE INVENTION

Automobiles are equipped with seat belt devices and airbag devices to secure safety for passengers in the automobiles. In recent years, there is a trend for controlling the operation of such safety devices according to the weight (body weight) of a passenger for improved performance of seat belt devices and airbag devices. For example, the amount of gas to be introduced into the airbag, an airbag inflating speed, or a pre-tension of the seat belt may be adjusted according to the weight of a passenger. For that purpose, some means are needed for measuring the weight of the passenger sitting on the seat. An example of such means includes a proposal of an apparatus for measuring the weight of a passenger by the following steps of arranging load sensors (strain gauges) at four corners of the bottom of a seat, obtaining loads on the respective corners, summing them to determine the seat weight including the weight of the passenger, and subtracting the seat weight when the passenger is not sitting thereon from the seat weight including the weight of the passenger.

A diagram of an example of such an apparatus is shown in FIG. 7. In FIG. 7, numeral 21 designates strain gauges arranged at four corners of the bottom of a seat. A voltage is constantly applied to the respective strain gauges 21 from a power source 22. As load is applied to the strain gauges 21, the resistance values of resistor elements forming bridges are changed so that the balances among the bridges are also changed, whereby minimal voltages are generated from the strain gauges 21. The minimal voltages are amplified by differential amplifiers 23, respectively, and are outputted. The outputs of the four differential amplifiers 23 are then inputted into a multiplexer 24, and selected one by one to be convened into digital signals by an A/D converter 25. The digital signals are inputted into a micro processor unit (MPU) 26. The MPU 26 reads the outputs of the amplifiers 23 one by one and multiplies each output by a conversion factor (sensitivity coefficient) to convert the outputs into load values. The load values are summed up to find the entire seat load. By using the seat load, the control of the seat belt device and/or the airbag device as mentioned above can be conducted by the MPU 26 or conducted by outputting the output to an external output circuit 29.

Each strain gauge 21 has an offset voltage. The term "offset voltage" means voltage to be generated when the load is zero. Since each strain gauge 21 has its own value of offset voltage, it is necessary to compensate for the offset voltages in order to accurately measure the load. Since the load measured by the strain gauges 21 is the sum of the weight of the passenger and the weight of the seat, the weight of the seat as the dead load must be subtracted from the measured load in order to obtain the weight of the passenger. The MPU 26 has a function for this calculation (dead weight calibration). That is, when the MPU 26 receives a command from an external input circuit 28 in a state in which no passenger sits on the seat, the MPU 26 stores the loads detected by the strain gauges 21 as vacant loads in a memory 27. In FIG. 7, the memory 27 includes four vacant load memory sections corresponding to the four strain gauges 21, respectively, in which the vacant loads are stored. After that, loads given by subtracting the vacant loads from the loads computed from the outputs of the differential amplifiers 23 are taken as the loads detected by the strain gauges 21. The sum of these loads is the load applied to the seat (e.g. the weight of the passenger) and is used for other control by the MPU 26 itself and/or is outputted to an external unit, if necessary.

Strictly speaking, since there are variations in the output voltages of the strain gauges 21 generated by the unit load for each of the strain gauges 21, compensation for sensitivity (sensitivity calibration) may be necessary. Since the sensitivity of the strain gauges 21 may be varied according to a way of fixing the strain gauges, sensitivity calibration may also be necessary. In this case, sensitivity coefficients of the strain gauges are calculated from differences between the outputs of the differential amplifiers 23 when no load is applied on the seat and the outputs of the differential amplifiers 23 when a predetermined load is applied on the seat. For measuring load, the load is calculated by multiplying the outputs of the differential amplifiers 23 by the sensitivity coefficients and in this way, the sensitivity calibration can be achieved. It is suitable that he sensitivity coefficients are stored in the memory 27.

As explained above, as long as commercially available metal strain gauges are used as the load sensors, the load applied on the seat can be accurately detected with a circuit construction as shown in FIG. 7. However, there is a problem that a lot of man-hours and skills are required to attach the commercially available metal strain gauges to the seat portion. One example solution to this problem is a method in which ceramic strain gauges are formed integrally with circuits by using printing technique on a member which receives the seat load.

The aforementioned example is shown in FIGS. 8(A), 8(B). In FIGS. 8(A), 8(B), a seat 31 comprises a seat squab 31a, a seat back 31b, seat rails 31c, and seat legs 31d. The seat 31 is supported by deformable members 32 which are supported to a vehicle floor by brackets 33. The deformable members 32 are made of steel. Integrally formed on the surface of each deformable member 32 are load sensors 35, 36 and printed wirings 37 which are formed by a printing technique. As the load on the seat 31 is transmitted to the deformable members 32 via the seat legs 31d, the deformable members 32 are bent with brackets 33 as supports and with the seat legs 31d as power points and the deformation due to the bending is detected by the sensors 35, 36. The deformable members 32 are disposed at two positions on both sides of the seat 31 whereby load applied on a front portion and load applied on a rear portion of the seat 31 can be separately detected in combination with the load sensors 35, 36.

According to this method, the load sensors 35, 36 and the printed wirings 37 are integrally formed by a printing technique, thereby facilitating the working steps. However, a load sensor manufactured by this method has defects in that the absolute values of the offset voltages and those variations are large and there are variations in the sensitivities as compared to the commercially available metal strain gauge which is manufactured by the use of fine processing technique such as lithography.

When the load sensors manufactured by the aforementioned method are used in an apparatus with the circuit construction as shown in FIG. 7, in extreme case, a problem may occur wherein the outputs of the differential amplifiers 23 are saturated due to the offset voltages of the load sensors. When the outputs of the differential amplifiers 23 are saturated, MPU 26 can no longer compensate to zero by using its dead weight calibrating function. Even when the outputs of the differential amplifiers 23 are not yet saturated, there is a problem that a weight heavier than a certain weight can not be measured due to the saturation of the amplifiers 23 when the offset values are shifted largely on one side (particularly, on the plus side of load) because this means that the measurable range is reduced. There is also a problem that it can not compensate for variations in the sensitivities of the respective load sensors because the circuit of FIG. 7 is not provided with a sensitivity calibrating mechanism.

Though the load sensor manufactured by the printing technique has excellent properties for the manufacturing process of itself, the load sensor has a problem in that it is hard to actually use because of its poor precision of measurement.

As a method for solving this problem, this applicant has filed a Japanese patent application, No. H10-294112, for a seat load measuring apparatus having a detecting circuit as shown in FIG. 1. In FIG. 1, numeral 1R designates a load sensor attached to a right-side deformable member 32, 1L designates a load sensor attached to a left-side deformable member 32. For each load sensor, "a" and "b" are elements for measuring front load and "c" and "d" are elements for measuring rear load. A normal voltage is applied to respective contacts between the elements "a" and "c" from a power source 2. Respective contacts between the elements "b" and "d" are grounded. Therefore, the front load can be detected by detecting voltages at contacts between the elements "a" and "b" and the rear load can be detected by detecting voltages at contacts between the elements "c" and "d".

Power source 2 is provided. The voltages at the contacts between the elements "a" and "b" and the voltages at the contacts between the elements "c" and "d" are inputted into a multiplexer 3. One voltage is selected from these voltages by the control of a micro processor unit (MPU) 6 and is inputted into a differential amplifier 4. The output of the differential amplifier 4 is converted into digital signal by a A/D converter 5 and then inputted into the MPU 6. The input of the multiplexer 3 is switched to the other and the output of the differential amplifier 4 is converted from analog signal to digital signal whereby the MPU 6 reads the output. In this way, the MPU 6 can read separately the front load and the rear load. The entire load on the seat can be obtained by summing these loads. Further, unbalance can be known from a difference between the front load and the rear load. External output circuit 9 is also provided.

The MPU 6 is supplied with a memory 7 in which areas for storing the offset correction amounts, the offset residuals, and the sensitivity coefficients are allocated (the areas shown in this drawing only correspond to No. 1 input line). The offset correction amount is outputted from the MPU 6 to a D/A converter 10 where the offset correction amount is converted into an analog signal to be added to the input of the differential amplifier 4.

When a dead weight calibrating command is inputted from the external input circuit 8, the MPU 6 calculates offset correction amounts for respective inputs of No. 1 through No, 4 such that the outputs of the differential amplifier 4 fall in corresponding predetermined ranges. The offset correction amounts are stored in the memory 7 and also outputted to the D/A converter 10. These amounts are converted into analog signals by the D/A converter 10 and inputted into the differential amplifier 4. Accordingly, the outputs of the differential amplifier 4 are adjusted to be near predetermined values. However, since the resolution of the D/A converter 10 has a limit, the outputs can not be completely adjusted to the predetermined values. Values still not compensated for reside as outputs of the differential amplifier 4. The outputs of the differential amplifier 4 are stored in the memory 7 as offset residuals. The seat load measuring apparatus shown in FIG. 1 is provided with a function for operating the aforementioned sensitivity calibration for the load sensors.

For measuring the load, the multiplexer 3 is switched to enter the output of a desired load sensor into the differential amplifier 4. At the same time, the offset correction amount corresponding to the load sensor is read out from the memory 7 and is passed through the D/A converter 10 into the differential amplifier 4 where the amount is subtracted from the output. The output of the differential amplifier 4 corresponding to the amount obtained from the subtraction is converted into digital signals by the A/D converter 5 and then read in the MPU 6, is then subtracted by the corresponding offset residual stored in the memory 7, and is multiplied by the corresponding sensitivity coefficient stored in the memory 7, thereby obtaining a load value.

According to the circuit construction, even when the offset voltages of the load sensors exist in the unloaded state, the output of the differential amplifier 4 can be prevented from being saturated. However, the sum of the seat weight and the load applied to the seat may sometimes exceed the measurable range of the load sensors 1R, 1L. In this case also, since the dead weight calibration is performed, the output of the seat weight measuring apparatus must seem to be in the measurable range. Therefore, there is a problem that it is impossible to know that the output exceeds the measurable range.

In addition, the seat load measuring apparatus may fail during the operation. For example, one or more of lines for the load sensors 1R, 1L may be broken, the differential amplifier 4 may fail, and an output variance (drift) may occur. Also when the load sensor 1R, the load sensor 1L, and/or the seat are improperly assembled, the load applied on the seat can not be correctly transmitted to the load sensors 1R, 1L. Just like this case, there is also a problem due to improper assembly. In these cases, the seat load can not be correctly measured. If the passenger does not notice and thus does not perform any action for coping with such a failure, the airbag device and/or the seat belt device which are aimed to ensure the safety of the passenger may be improperly controlled.

The present invention was made under the aforementioned circumstances and the object is to provide a diagnostic method for a seat load sensor that can detect abnormality of the seat load measuring apparatus including a seat load measuring apparatus of such a construction of the prior application.

SUMMARY OF THE INVENTION

A first means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat and an amplifier for amplifying signals from the load sensors, the diagnostic method comprising the steps of comparing information from the seat load measuring apparatus in a state in which the vehicle seat is not mounted on the load sensors to information from the seat load measuring apparatus in a state in which the vehicle seat is mounted on the load sensors, and thereby judging whether the seat load measuring apparatus normally functions.

As shown in FIGS. 8(A), 8(B), right and left deformable members 32 to which load sensors are attached are assembled into a seat supporting member. In this state, these members are delivered from an automotive parts manufacturer to a seat manufacturer. Before the delivery, the load sensors are connected to a measuring circuit (as shown in FIG. 1) without any load on the load sensors and information from the seat load measuring apparatus is stored in this state. As the vehicle seat is mounted on the deformable members, a load corresponding to the weight of the vehicle seat is applied on the load sensors so that the information from the seat load measuring apparatus is changed. A changed amount is previously determined corresponding to the load of the vehicle seat. Therefore, when the changed amount exceeds an allowable range about a reference amount, it can be determined that the seat load measuring apparatus is abnormal. The abnormality of the seat load measuring apparatus includes a case where the measuring apparatus itself fails and a case where the vehicle seat is not properly mounted on the deformable members so as not to correctly transmit the load to the load sensors. It should be noted that the information from the seat load measuring apparatus is at least one of values relating to the output of the load sensors such as a measured load value, a dead weight correction amount (offset correction amount), and an output of the amplifier.

When a plurality of load sensors are employed for measuring the load of the vehicle seat, a diagnosis for detecting an abnormality may be performed for each of the load sensors, or may be performed for some or all of the load sensors. The same is true for other inventions according to the present invention.

A second means for solving the aforementioned problems is a diagnostic method for a seat load measuring apparatus for measuring the load applied on a vehicle seat, wherein the seat load measuring apparatus comprises a plurality of load sensors for detecting the weight of the vehicle seat itself and the weight of an object on the vehicle seat and a plurality of amplifiers for amplifying signals from the load sensors, the diagnostic method comprising the steps of comparing the respective pieces of information from seat load measuring portions corresponding to the respective load sensors when the load sensors are assembled in seat portions, and thereby judging whether the seat load measuring apparatus normally functions.

According to this means, a comparison is made between the respective pieces of information from seat load measuring portions corresponding to the respective load sensors when the load sensors are assembled in the seat portions. When a difference as a result of the comparison exceeds a range of reference or is smaller than the range of reference, it is determined that the load sensors are not properly assembled to the seat portions or that one or more of the load sensors is abnormal, thereby detecting the abnormality of the load sensors. When the seat load measuring portions are common to all of the load sensors as shown in FIG. 1, the judgement is made for each load sensor assuming that the common seat load measuring portions are disposed for each of the load sensors. For example, values obtained from an A/D converter with regard to the respective load sensors are compared. It should be noted that the seat portions are portions on which the seat is mounted and correspond to brackets 33 shown in FIG. 8 or a seat supporting member.

A third means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat and an amplifier for amplifying signals from the load sensors, the diagnostic method comprising the steps of comparing information from the seat load measuring apparatus in a state in which the vehicle seat is mounted on the load sensors but before installation to the vehicle body to information from the seat load measuring apparatus after the installation to the vehicle, and thereby judging whether the seat load measuring apparatus normally functions.

The information from the seat load measuring apparatus must not be significantly changed between before and after a seat unit comprising the load sensors and the seat mounted on the load sensors is installed in the vehicle. When the information is changed by an amount exceeding an allowable value, it is determined that the load sensors are not properly assembled or that one or more of the load sensors are abnormal, thereby detecting the abnormality of the load sensors.

A fourth means for solving the aforementioned problems is a diagnostic method for a seat load measuring apparatus for measuring the load applied on a vehicle seat, wherein the seat load measuring apparatus comprises plurality of load sensors for detecting the weight of the vehicle seat itself and the weight of an object on the vehicle seat and plurality of amplifiers for amplifying signals from the load sensors, the diagnostic method comprising the steps of comparing the respective pieces of information from seat load measuring portions corresponding to the respective load sensors when seat portions with the load sensors are installed to a vehicle body, and thereby judging whether the seat load measuring apparatus normally functions.

According to this means, comparison is made between the respective pieces of information from seat load measuring portions corresponding to the respective load sensors when the seat portions with the load sensors are installed onto a vehicle body. When a difference as a result of the comparison exceeds a range of reference or is smaller than the range of reference, it is determined that the seat portions are not properly installed onto the vehicle body or that one or more of the load sensors is abnormal, thereby detecting the abnormality of the load sensors. When the seat load measuring portions are common to all of the load sensors as shown in FIG. 1, the judgement is made for each load sensor assuming that the common seat load measuring portions are disposed for each of the load sensors. For example, values obtained from an A/D converter with regard to the respective load sensors are compared.

A fifth means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat and an amplifier for amplifying signals from the load sensors, the diagnostic method comprising the steps of comparing information from the seat load measuring apparatus in a state in which no load is applied to the load sensors to information from the seat load measuring apparatus in a state in which a predetermined load is applied to the load sensors, and thereby judging whether the seat load measuring apparatus normally functions.

According to this means, for example, before the delivery from the automotive parts manufacturer to the seat manufacturer as mentioned with regard to the first means and in a state in which the right and left deformable members to which load sensors are attached are assembled into a seat supporting member, a comparison is made between information from the seat load measuring apparatus in a state in which no load is applied to the load sensors and information from the seat load measuring apparatus in a state in which a predetermined load is applied to the load sensors. This comparison is equal to a test of the sensitivity of the seat load measuring apparatus. When the sensitivity obtained by this comparison is not in a range of reference, it is determined that the seat load measuring apparatus is abnormal.

A sixth means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat and an amplifier for amplifying signals from the load sensors, the diagnostic method comprising the steps of comparing information from the seat load measuring apparatus in a state in which no load is applied to the vehicle seat to information from the seat load measuring apparatus in a state in which a predetermined load is applied to the vehicle seat, and thereby judging whether the seat load measuring apparatus normally functions.

According to this means, a comparison is made between information from the seat load measuring apparatus in a state in which no load is applied to the vehicle seat and information from the seat load measuring apparatus in a state in which a predetermined load is applied to the vehicle seat. When a difference obtained by this comparison is outside of a predetermined range, it is determined that the seat load measuring apparatus is abnormal. It should be noted that this test may be made before the seat is installed on the vehicle body or after the seat is installed on the vehicle body.

A seventh means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat and an amplifier for amplifying signals from the load sensors, the diagnostic method comprising the steps of comparing a sensitivity of the seat load measuring apparatus before the vehicle seat is mounted on the load sensors to a sensitivity of the seat load measuring apparatus after the vehicle seat is mounted on the load sensors, and thereby judging whether the seat load measuring apparatus normally functions.

According to this means, a comparison is made between sensitivities of the seat load measuring apparatus before and after the seat is mounted on the load sensors. When the seat load measuring apparatus normally functions, the difference between the sensitivities must be in a predetermined range. When the difference is out of the predetermined range, it is determined that the seat load measuring apparatus is abnormal. It should be noted that this test may be made before the seat is installed on the vehicle body or after the seat is installed on the vehicle body.

A eighth means for solving the aforementioned problems is a diagnostic method according to any one of the first means through the seventh means, wherein at least an output of said amplifier is used as the information from said seat load measuring apparatus.

Since the output of the amplifier directly indicates the load, the comparison of the outputs enables easy and accuracy detection for abnormality of the seat load measuring apparatus. For example, when a difference between the output of the amplifier when no load is applied to the seat and that when a predetermined load is applied to the seat or a difference between the output of the amplifier when the seat is not mounted on the load sensors and that when the seat is mounted on the load sensors is not in a predetermined range, it can be determined that the seat load measuring apparatus is somewhat abnormal. It should be understood that the output of the amplifier includes not only an output itself of the amplifier but also a value convened from the output by an A/D converter.

A ninth means for solving the aforementioned problems is a diagnostic method according to any one of the first means through the eighth means, wherein the seat load measuring apparatus has a dead weight calibrating portion, wherein at least an output of the dead weight calibrating portion in each of said states is used as the information from said seat load weight measuring apparatus.

The dead weight calibrating portion has a function of controlling an output of the amplifier in a certain state to a predetermined value, or storing an output of the amplifier in a certain state and subtracting the output from another output obtained after that. Therefore, the output of the dead weight calibrating portion (for example, the offset correction amounts, the offset residuals) can be considered to be equal to the output of the amplifier according to the ninth means. That is, the comparison of the outputs also enables easy and accurate detection of abnormality of the seat load measuring apparatus.

A tenth means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat, an amplifier for amplifying signals from the load sensors, and a dead weight calibrating portion, the diagnostic method comprising the steps of making initial dead weight calibration in a state in which the seat is mounted on the load sensors, storing a correction amount for this calibration as an initial correction amount, and comparing the initial correction amount to a correction amount for another dead weight calibration made after the initial dead weight calibration, and thereby judging whether the seat load measuring apparatus normally functions.

Even when the seat load measuring apparatus is normal at first, it may fail or its properties may be varied during the operation due to various causes. To detect such a variation during the operation, a dead weight correction amount (offset correction amounts and offset residuals) for the initial dead weight calibration is stored. Then, a dead weight correction amount for another dead weight calibration is compared with the initial dead weight correction amount for every dead weight calibration. Thus, when a difference between them exceeds a predetermined value, it is determined that the seat load measuring apparatus fails or is abnormal. The dead weight calibration to be performed in a state in which the seat is mounted on the load sensors may be performed before or after the seat is installed on the vehicle body. Another calibration may be performed before the seat is mounted and after the seat is mounted.

A eleventh means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat, an amplifier for amplifying signals from the load sensors, and a dead weight calibrating portion, the diagnostic method comprising the steps of making initial dead weight calibration in a state in which the seat is not mounted on the load sensors, storing a correction amount for this calibration as an initial correction amount, and comparing the initial correction amount to a correction amount for another dead weight calibration made after the initial dead weight calibration, and thereby judging whether the seat load measuring apparatus normally functions.

The difference of this means from the aforementioned tenth means is that a correction amount for initial dead weight calibration in a state in which the seat is not mounted on the load sensors is used as the initial correction amount. This means also exhibits the same works and effects as the tenth means. Another calibration may be performed before the seat is mounted and after the seat is mounted.

A twelfth means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat, an amplifier for amplifying signals from the load sensors, and a dead weight calibrating portion, the diagnostic method comprising the steps of making dead weight calibration in a state in which the seat is mounted on the load sensors, storing an output of the seat load measuring apparatus as an initial value, and comparing the initial value to an output of the seat load measuring sensor measured when no object is on the seat, and thereby judging whether the seat load measuring apparatus normally functions.

According to this means, the output of the seat load measuring apparatus when the dead weight calibration is performed is stored as an initial value and, after that, the initial value is compared to an output of the seat load measuring sensor measured when no object is on the seat. When the seat load measuring apparatus normally functions, the variation in the output of the seat load measuring apparatus should be within a predetermined range. When it is outside of the predetermined range, it is determined that an abnormality has occurred. According to this means, deterioration with age of the seat load measuring apparatus can be detected.

A thirteenth means is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat, an amplifier for amplifying signals from the load sensors, and a dead weight calibrating portion, the diagnostic method comprising the steps of making dead weight calibration in a state in which the seat is not mounted on the load sensors, storing a correction amount for this calibration as a first correction amount A, in addition making dead weight calibration again in a state in which the seat is mounted on the load sensors, storing a correction amount for this calibration as a second correction amount B, after that, measuring load applied on the seat by using the second correction amount B to output a measured value as the output of the load measuring apparatus, measuring the load applied on the seat by using the first correction amount A, and emitting an alarm or performing a compensating calculation when the value measured by using the first correction amount A exceeds a predetermined value.

The final load on the seat is obtained by subtracting a dead weight amount for dead weight calibration made in a state in which the seat is mounted on the load sensors from a measured load. However, in a case where the weight of the seat is too heavy or where the seat is abnormally mounted, there is a possibility that load on the load sensors exceeds the measurable range of the load sensors. According to this means, when the value measured using the first correction amount A exceeds the predetermined value, it is determined that the load exceeds the measurable range of the load sensors. In this case, an alarm is emitted and/or a compensating calculation is performed using a correction value predetermined by a previous measurement. Therefore, false judgement due to too large a load exceeding the measurable range can be prevented.

A fourteenth means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat, an amplifier for amplifying signals from the load sensors, and a dead weight calibrating portion, the diagnostic method comprising the steps of making dead weight calibration in a state in which the seat is not mounted on the load sensors and a predetermined load is applied to the load sensors, storing a correction amount for this calibration as a first correction amount C, in addition making dead weight calibration again in a state in which the seat is mounted on the load sensors, storing a correction amount for this calibration as a second correction amount D, after that, measuring load applied on the seat by using the second correction amount D to output a measured value as the output of the load measuring apparatus, measuring the load applied on the seat by using the first correction amount C, and emitting an alarm or performing a compensating calculation when the value measured by using the first correction amount C exceeds a predetermined value.

According to the construction of the seat load measuring apparatus, there is a case in which the resolution of the amplifier is increased by setting the measurable range of the amplifier to be smaller than the measurable range of the load sensors. For example, when the measurable range of the load sensors is 200 kgf, the measurable range of the amplifier is 50 kgf. In this case, there is a case that the output of the amplifier does not show whether total weight applied on the load sensors exceeds 200 kgf. According to this means, the dead weight calibration is made in a state in which a load, for example of 180 kgf, is applied to the load sensors before the seat is mounted and the dead weight correction amount C for this dead weight calibration is stored (if necessary, the output of the amplifier is also stored) in addition to the normal dead weight correction amount D.

Then, measurement is made periodically with the dead weight correction amount C and the output is measured. For example, in the case that the output just after the dead weight calibration when load of 180 kgf is applied to the load sensors is 0, the indication of 30 kgf by a following measurement means that the output of the load sensors is 210 kgf and this load exceeds the measurable range. In this case, an alarm is emitted or a compensating calculation is performed.

As mentioned above, according to this means, it can be detected that the load exceeds the measurable range of the load sensors even when the measurable range of the amplifier is smaller than that of the load sensors.

A fifteenth means for solving the aforementioned problems is a diagnostic method for a seat load measuring apparatus for measuring the load applied on a vehicle seat, wherein the seat load measuring apparatus comprises load sensors for detecting the weight of the vehicle seat itself and the weight of an object on the vehicle seat, an amplifier for amplifying signals from the load sensors, and a sensitivity calibrating portion for the load sensors, the diagnostic method comprising the steps of making initial sensitivity calibration, storing a sensitivity correction amount for this calibration, and comparing the sensitivity correction amount to a sensitivity correction amount for another sensitivity calibration made after the initial sensitivity calibration, and thereby judging whether the seat load measuring apparatus normally functions.

According to this means, a sensitivity correction for initial sensitivity calibration is stored and, after that, the sensitivity correction amount is compared with a sensitivity correction amount for another sensitivity calibration made after the initial sensitivity calibration, thereby detecting deterioration with age in the sensitivity of the seat load measuring apparatus. It is preferable that the initial sensitivity correction amount is a sensitivity correction amount for the sensitivity calibration made before delivery from the automotive parts manufacturer i.e. before the seat is installed.

EMBODIMENTS FOR CARRYING OUT THE INVENTION

Figure 1:
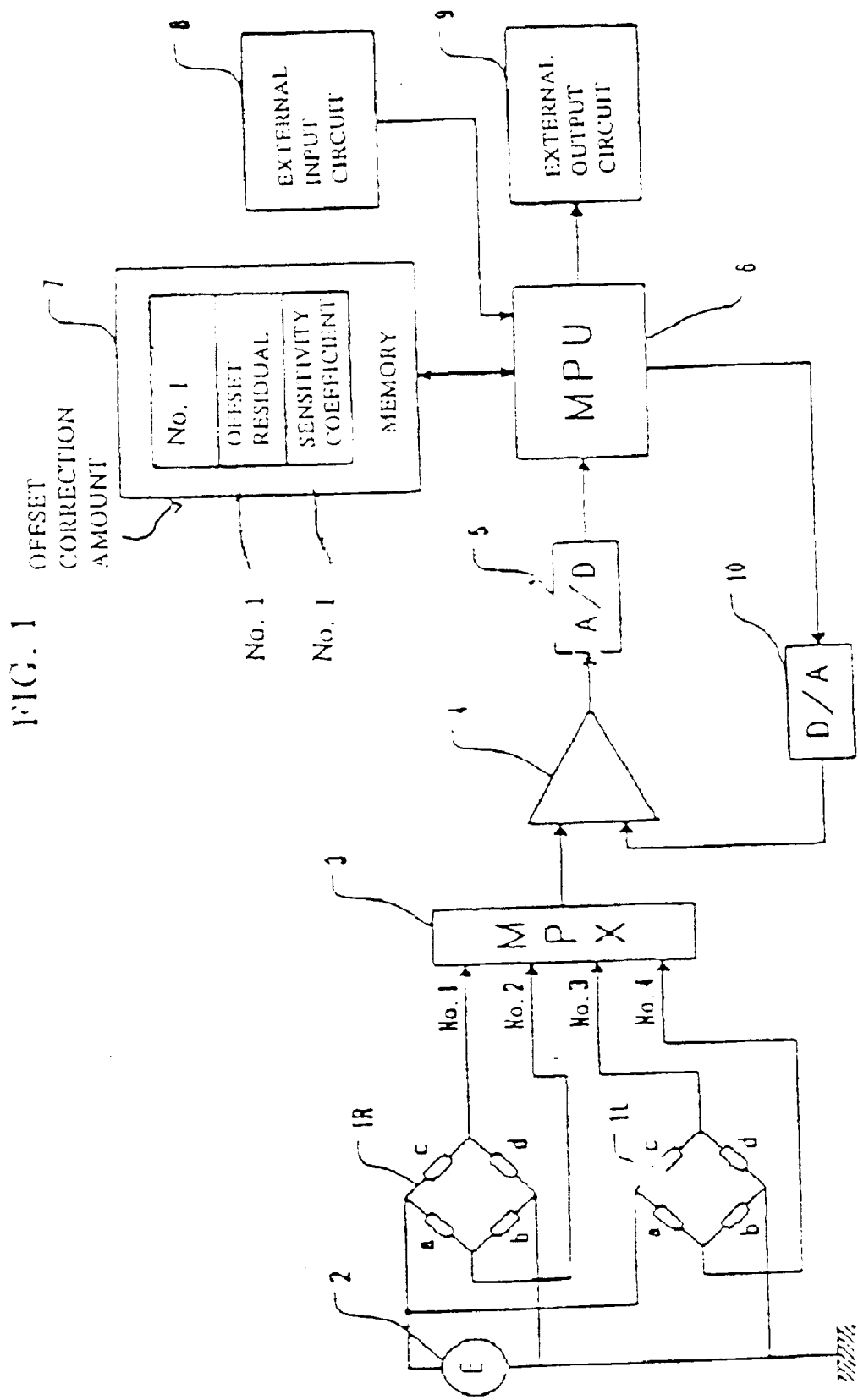
FIG. 1 is a schematic circuit diagram showing the construction of a seat load measuring apparatus invented by the inventors of this application.
Figure 8:
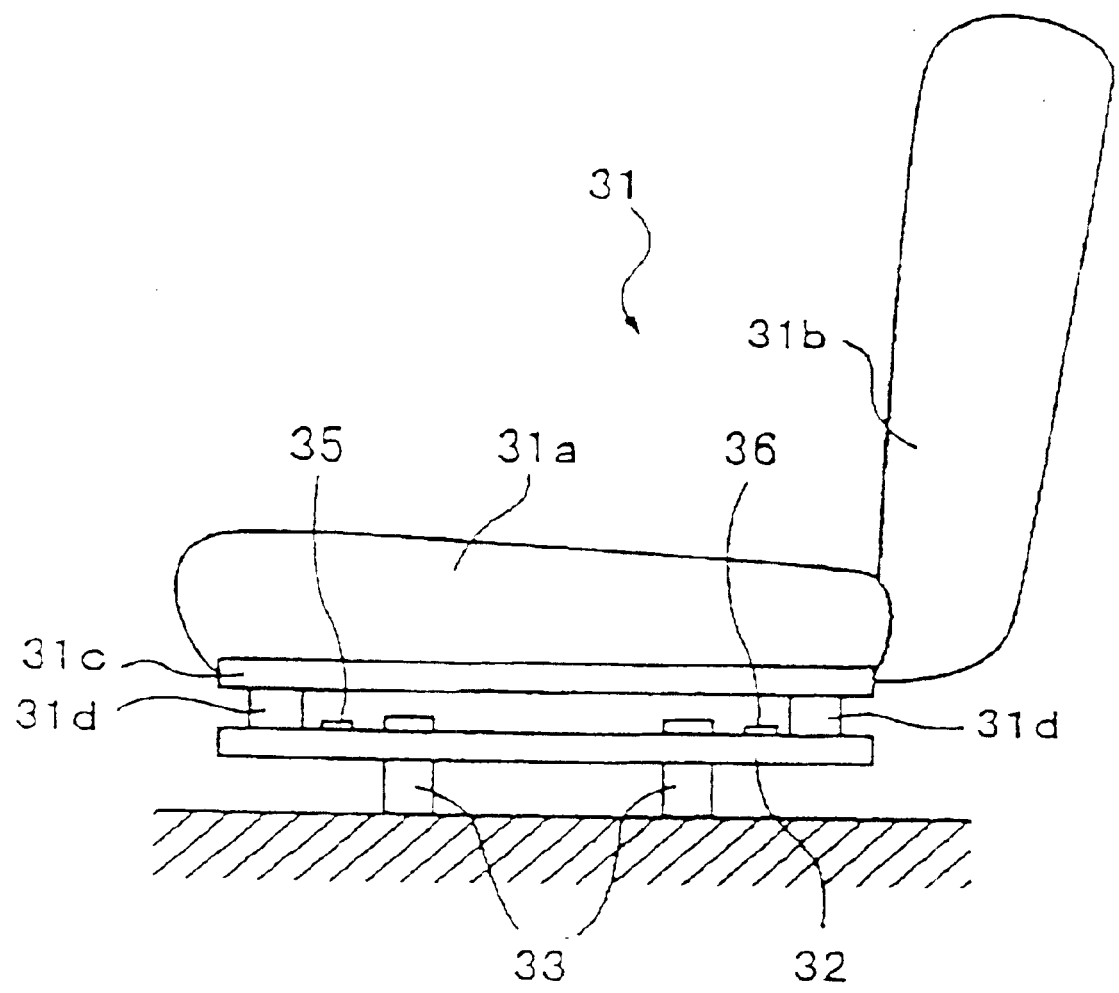
FIGS. 8(A), 8(B) are schematic views indicating a method of installing seat load sensors.
Figure 8:
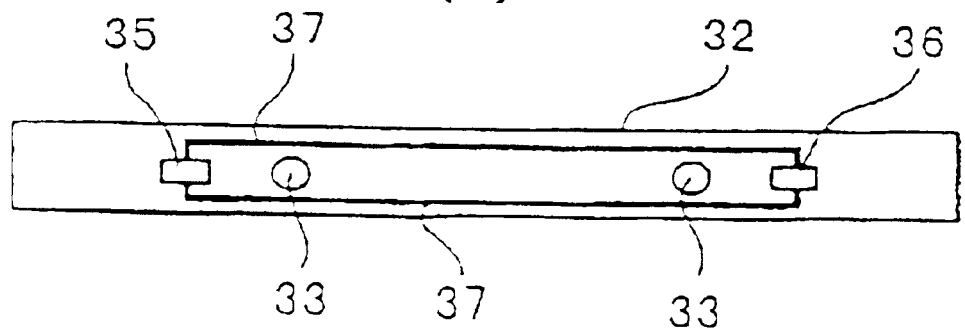

A seat load measuring apparatus is installed on a vehicle body by the following steps. As shown in FIGS. 8(A), 8(B), right and left deformable members 32 to which load sensors 35,36 are attached are assembled into a seat supporting member. In this state, these members are delivered from an automotive parts manufacturer to a seat manufacturer. At this point, in the state in which the right and left deformable members 32 are assembled in the seat supporting member, the load sensors are connected to a measuring circuit as shown in FIG. 1 and the dead weight calibration is performed. Offset correction amounts and offset residuals thus obtained by detecting loads at 4 points (i.e. front-rear and left-right) are stored in a memory in a MPU as initial data.

After completion of the dead weight calibration, a predetermined load is applied to the respective deformable members, front and rear on both sides. Values of outputs of an A/D converter corresponding to No. 1 through No. 4 in FIG. 1 at this point are read. From these values, sensitivity coefficients of the four load sensors, front and rear on both sides, are obtained and stored in the memory of the MPU as initial data. Load is calculated with these sensitivity coefficients.

For the deformable members 32 shown in FIGS. 8(A), 8(B), mechanical stoppers (not shown) may often be provided to prevent the deformable members 32 from being broken when an abnormal load is applied. In this case, the load values for the respective load sensors are obtained and stored in the MPU in a case where the deformable members 32 come in contact with the stoppers. The load values are used as values indicating the maximum measurable load. When the differential amplifier 4 is saturated until the deformable members come in contact with the stoppers, the offset correction amounts for the dead weight calibration are changed to shift the zero point of the differential amplifier 4. Then, a further load is applied after the saturation of the differential amplifier 4 is cancelled, the load when the deformable members 32 come in contact with the stoppers is measured. In this case, the sum of the measured load and the load corresponding to the value of shifting the zero point of the differential amplifier 4 is the load making the deformable members 32 come in contact with the stoppers. The sum of or the difference between the measured load and the amount of shifting the zero point of the differential amplifier 4 is stored in the MPU.

In this manner, the seat load measuring apparatus is delivered to the seat manufacturer after the dead weight calibration and the sensitivity calibration are completed, and the information of the measuring range, etc., is recorded (stored in memory).

At the site of the seat manufacturer, a seat is assembled on the seat load measuring apparatus. After the assembly of the seat, the output of the seat load measuring apparatus is checked to make sure that the seat has been correctly assembled and that there is no failure in the seat load measuring apparatus. First, the output (total weight) of the seat load apparatus is read. It is checked whether the output of the seat load apparatus is substantially the same as a value determined by the weight of the seat. When the difference between the output and the value exceeds an allowable range, the assembly may be abnormal or the seat load measuring apparatus may be abnormal.

Next, load values indicated by the respective load sensors are read. It is checked whether the differences between them are within predetermined ranges. Once the seat load measuring apparatus has been assembled to the seat, the weight of the seat is dispersed into the load sensors at four locations. However, when the seat has been deformed or when the seat load measuring apparatus has been incorrectly assembled to the seat, the weight of the seat may not be correctly dispersed into the load sensors. In this case, even when the total weight is in the measurable range, differences among the load sensors become large, and thereby cause an imbalance. The outputs of the load sensors are compared to the initial data stored in the memory to check whether the differences as a results of the comparison are within predetermined ranges. Alternatively, the outputs of the four load sensors may be mutually compared to the others, to check whether differences as results of the comparison are within predetermined ranges. Further, the outputs of respective two of the four load sensors may be summed to obtain respective total outputs to check whether the difference between them is in a predetermined range. Furthermore, the center-of-gravity position of the seat may be calculated from the outputs of the four load sensors to check whether the position is in the predetermined range. If not, the assembly may be abnormal or the seat load measuring apparatus may be abnormal.

When the above tests show normality, the weight detected by the respective load sensors and the total weight are stored in the MPU.

If necessary, a test for sensitivities of the load sensors is made by applying a predetermined load on the seat after the seat is assembled and checking whether the load values indicated by the load sensors are increased for the predetermined load.

At the site of a car manufacturer, the same tests made by the seat manufacturer are made after the seat is assembled onto a vehicle body. That is, the tests include the test for checking the total weight of the seat and the test for checking the balance between the loads detected by the respective load sensors. When these tests show normality, the weight detected by the respective load sensors and the total weight are stored as initial data at the shipment from the car manufacturer.

If necessary, a test for sensitivities of the load sensors is made by applying a predetermined load on the seat after the seat is assembled and checking whether the load values indicated by the load sensors are increased for the predetermined load.

After the above tests show that the seat is normally assembled and the seat load measuring apparatus is normal, the dead weight calibration is made in a state in which the seat is mounted. Offset correction amounts and offset residuals for this calibration are stored in the MPU as initial data at the shipment from the manufacturer. The seat load after that is measured based on the initial data unless the dead weight calibration is made again. As described in the Summary of the Invention, a diagnosis for detecting an abnormality may be performed for each of the load sensors, or may be performed for some or all of the load sensors (for example, the total of the outputs of all of the load sensors). To reduce the memory requirements of the MPU, the dead weight calibration may be performed not for each of the individual load sensors, but rather performed relative to the total of the outputs of all of the load sensors and the dead weight correction amount for this calibration may be stored as initial data. Alternatively, the maximum measurable load (measurable range) may be stored as the total of the outputs of some or all of the load sensors. The diagnosis for detecting an abnormality can be performed with such stored data.

After the shipment of the vehicle from the manufacturer, zero point checking for seat load is made constantly. Zero point checking is for checking whether the output (total weight) of the seat load measuring apparatus is significantly shifted from the zero point and/or whether the outputs of the respective load sensors are not in balance when it is apparent that no load is on the seat, for example when a seat belt is released and an engine key is not inserted. If so, an alarm is emitted. The zero point checking may be triggered by a person using a press button. Even when it is not apparent that no load is on the seat, it also checks whether outputs of the respective load sensors measured based on the initial data at the shipment from the parts manufacturer and/or the initial data at the shipment from the car manufacturer exceed predetermined values and/or whether the outputs of the respective load sensors are not in balance when the result (total load) of measuring the seat load is near zero. If so, an alarm is emitted. Also, when the result (total load) of measuring the seat load steadily reads negatively (opposite to gravity), an alarm is emitted. Even when the result (total load) of measuring the seat load shows any value, it may check whether the load applied on each load sensor exceeds the maximum measurable load. If so, the procedure of processing the calculation may be changed. For example, the measurement may be canceled, the previous load value may be held, or a calculation for compensation may be performed, thereby eliminating the possibility of misdiagnosis. When such a situation (the load exceeds the maximum measurable load) is continued during a period of time or occurs frequently, it is decided that there is an abnormality and an alarm is thus emitted. Such a situation may occur not only by an abnormality of the seat and/or the seat load measuring apparatus, but also by the weight of an occupant having a heavy weight. For this, the predetermined values for diagnosis may be changed according to the result (total weight) of measuring the seat load.

If necessary, the dead weight calibration may be automatically or manually made. This is for making again the dead weight calibration when it is apparent that no load is on the seat, for example when a seat belt is released and an engine key is not inserted, or when a press button is pressed. A dead weight correction amount (offset correction amounts and offset residuals) is stored in the MPU and may be used for hysteresis management or compared with the initial data for use in abnormality diagnosis.

Embodiments carrying out the present invention in the aforementioned checkings will be described with reference to a flow chart. In the following diagnostic methods, the number of sensors installed to the seat is not limited so that the number of sensors may be four or two. Alternatively, the following diagnostic methods may be done with the total of the outputs of plural sensors. It should be noted that the seat load measuring apparatus as an object of the following diagnostic methods is the apparatus shown in FIG. 1.

Figure 2:
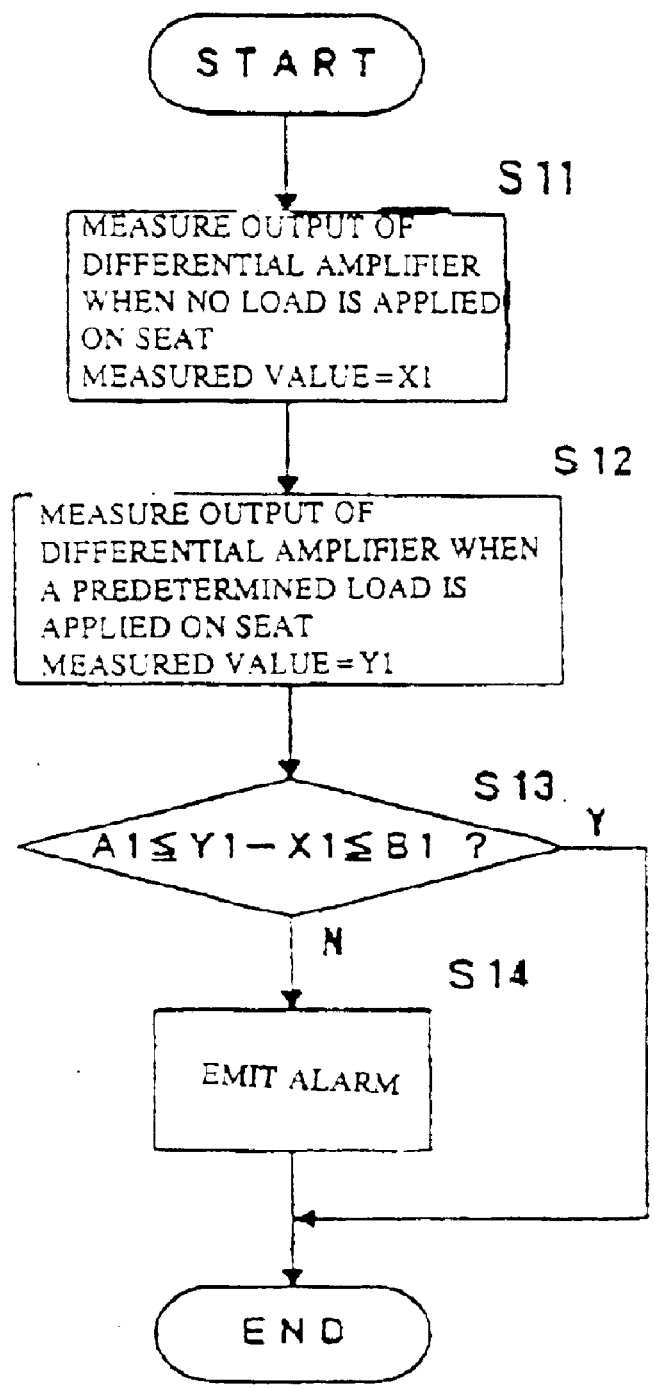
FIG. 2 is a flow chart showing a diagnostic method as a first embodiment of the present invention.

FIG. 2 is a flow chart showing a diagnostic method as a first embodiment of the present invention. This flow is triggered by a command from the external input circuit 8. As started at a step S11, the output of the differential amplifier 4 (a value of the A/D converter 5) in the non-loaded state (under a condition in which no load is applied to the seat) is measured. The measured value is assumed as X1. Next, at a step S12, a predetermined load is applied to the seat and, in this state, the output of the differential amplifier 4 is measured. The measured value is assumed as Y1. At a step S13, it is judged whether a difference between X1 and Y1 is in a predetermined range between A1 and B1, i.e. an expression $A1 \leq Y1-X1 \leq B1$ is established. When the difference between X1 and Y1 is not in the range between A1 and B1, an alarm indicating abnormality is emitted at a step S14. Though not shown in this flow chart, the above actions are repeated for each of the outputs No. 1 through No. 4 of the load sensors.

In this manner, it can be checked that the sensitivities of the load sensors indicate normal values in the state in which the seat is installed, that the load sensitivity of the entire seat indicates a normal value, and that the seat is normally assembled.

Instead of the action at the step S11, the value of the differential amplifier 4 measured in the state in which the seat is not assembled to the load sensors 1R, 1L (under a condition that the seat is not mounted) may be assumed as X1. Instead of the action at the step S12, the value of the differential amplifier 4 in the state in which the seat is assembled to the load sensors 1R, 1L may be assumed as Y1. In this case, the weight of the seat corresponds to the predetermined load.

Figure 3:
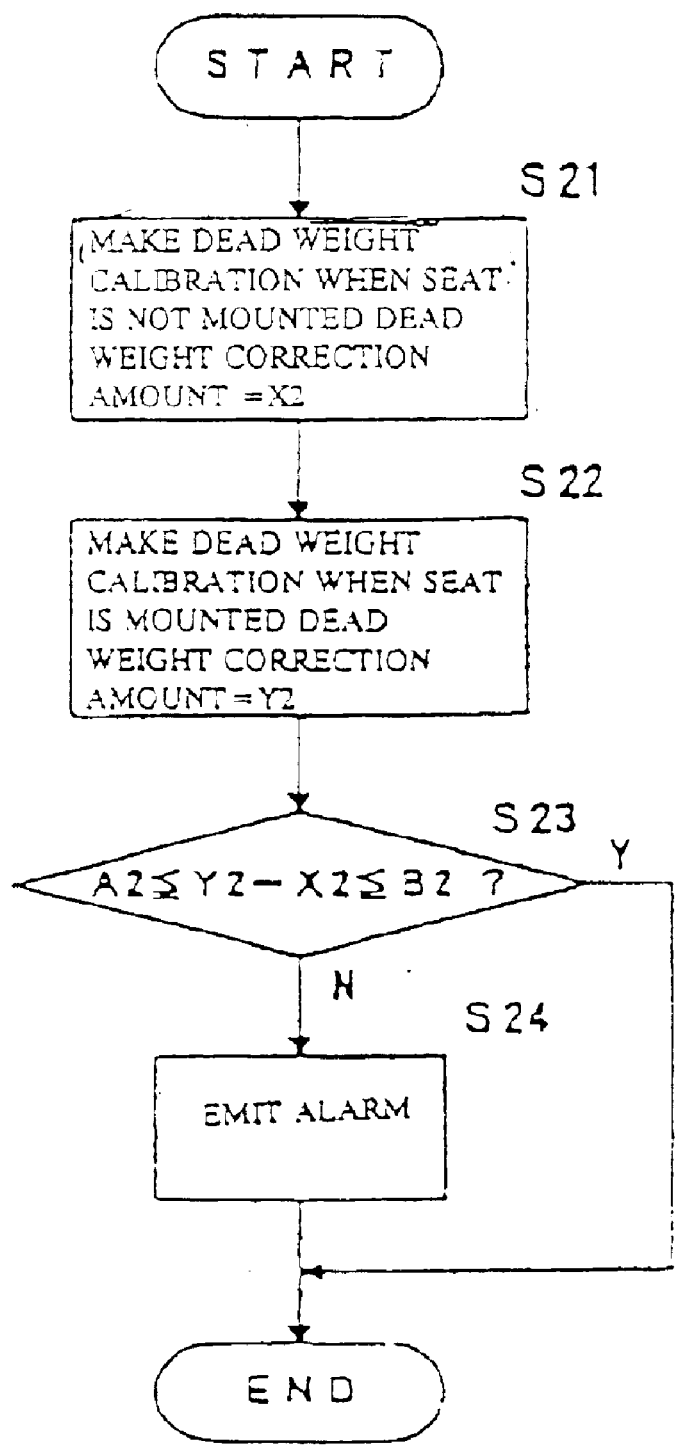
FIG. 3 is a flow chart showing a diagnostic method as a second embodiment of the present invention.

FIG. 3 is a flow chart showing a diagnosis method as a second embodiment of the present invention. This flow is triggered by a command from the external input circuit 8. As started at a step S21, the dead weight calibration is made in the state in which the seat is not assembled to the load sensors 1R, 1L. A dead weight correction amount for this calibration is assumed as X2. The dead weight correction amount is an amount to be added to the differential amplifier to make the output of the differential amplifier 4 equal to a predetermined value, that is, the offset correction amounts and the offset residuals shown in FIG. 1.

Next, at a step S22, the dead weight calibration is made again in the state in which the seat is assembled. A dead weight correction amount for this calibration is assumed as Y2. At a step S23, it is judged whether a difference between X2 and Y2 is in a predetermined range between A2 and B2, i.e. an expression $A2 \leq Y2-X2 \leq B2$ is established. When the difference between X2 and Y2 is not in the range between A2 and B2, an alarm indicating abnormality is emitted at a step S24. Though not shown in this flow chart, the above actions are repeated for each of the load sensors.

In this manner, it can be checked particularly that the sensitivities of the load sensors indicate normal values in the state in which the seat is normally assembled.

After the seat is assembled to the load sensors, instead of the calculation at the step 321, the dead weight calibration may be made in the non-loaded state to the seat. Instead of the calculation at step S22, the dead weight calibration may be made in the state ion which a predetermined load is applied.

Figure 4:
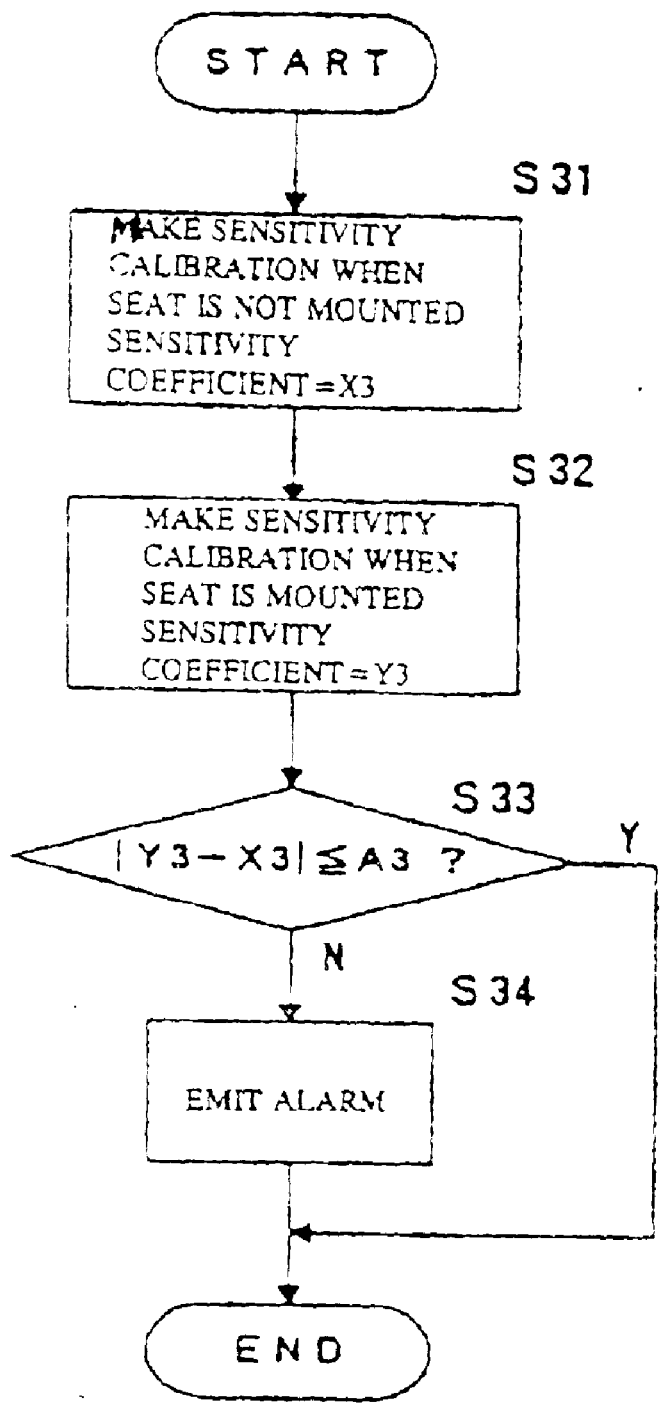
FIG. 4 is a flow chart showing a diagnostic method as a third embodiment of the present invention.

FIG. 4 is a flow chart showing a diagnosis method as a third embodiment of the present invention. This flow is triggered by a command from the external input circuit 8. As started at a step S31, the sensitivity calibration is made in the state in which the seat is not mounted. A sensitivity coefficient obtained at this step is assumed as X3. The sensitivity coefficient is obtained by first obtaining a difference $\Delta V$ between the output of the differential amplifier 4 when no load is applied and the output of the differential amplifier 4 when a predetermined load W is applied, and applying the value $\Delta V$ into an expression, for example, $k=W/\Delta V$. At a step S32, the sensitivity calibration is made in the state in which the seat is mounted. A sensitivity coefficient obtained at this step is assumed as Y3. At a step S33, it is judged whether a difference between X3 and Y3 is equal to or less than a predetermined value A3, i.e. an expression $|Y3-X3| \leq A3$ is established. When the difference between X3 and Y3 is larger than the predetermined value A3, an alarm indicating abnormality is emitted at a step S34. Though not shown in this flow chart, the above actions are repeated for each of the load sensors.

In this manner, it can be checked particularly that the seat is normally assembled.

Figure 5:
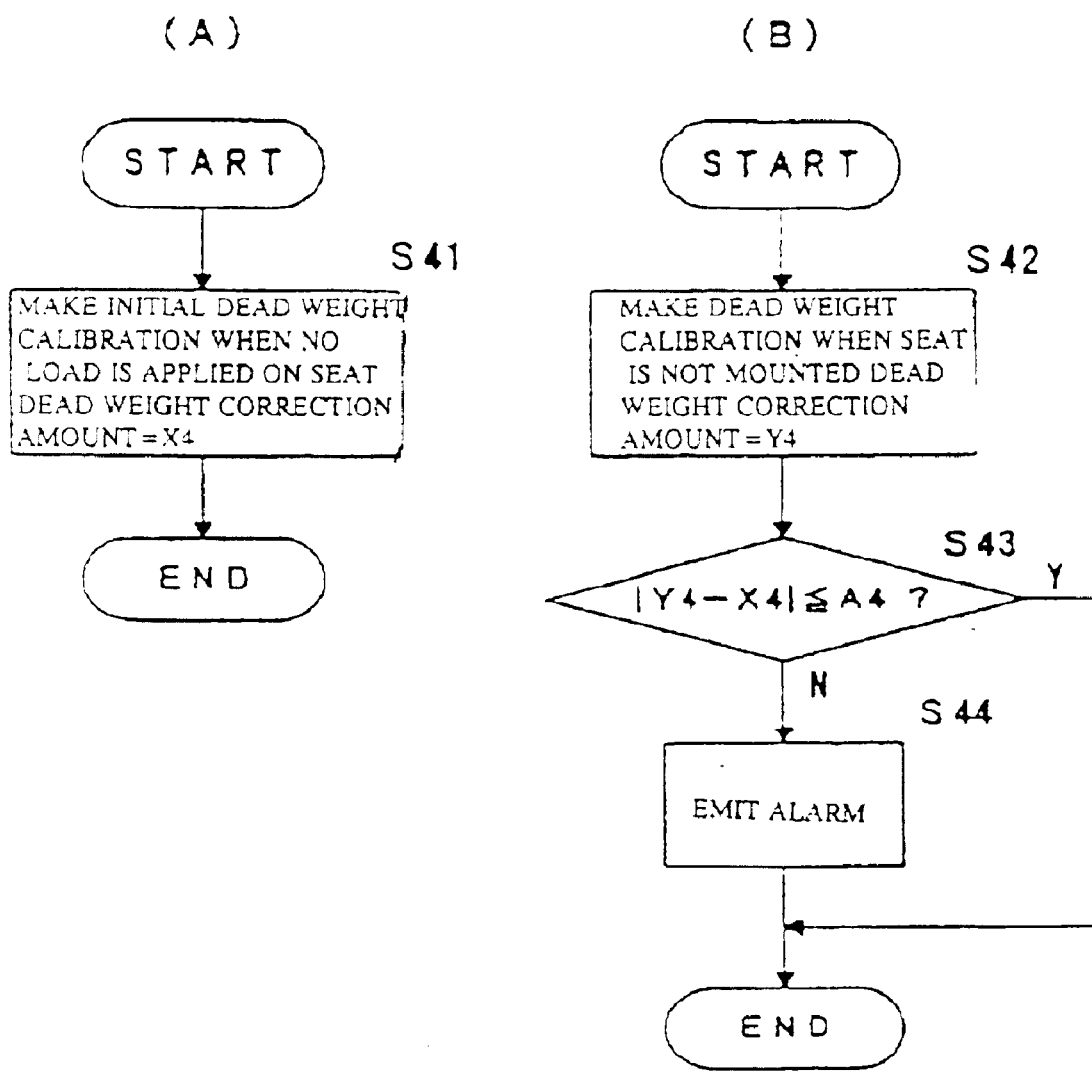
FIGS. 5(A), 5(B) are flow charts showing a diagnostic method as a fourth embodiment of the present invention.

FIGS. 5(A),5(B) are flow charts showing a diagnosis method as a fourth embodiment of the present invention. FIG. 5(A) shows actions to be made before the sale of the vehicle and FIG. 5(B) shows actions to be made after the sale of the vehicle. During the assembly of the vehicle, at a step S41, the initial dead weight calibration is made in the state in which no load is applied on the seat according to a command from the external input circuit 8 to obtain a dead weight correction amount X4 which is stored in the memory.

After the sale of the vehicle, at a step S42, the dead weight calibration is made in the state in which the seat is not mounted according to a command outputted at a repair shop or the like to obtain a dead weight correction amount Y4. At a step S43, it is judged whether a difference between X4 and Y4 is equal to or less than a predetermined value A4, i.e. an expression $|Y4-X4| \leq A4$ is established. When the difference between X4 and Y4 is larger than the predetermined value A4, an alarm indicating abnormality is emitted at a step S44. Though not shown in this flow chart, the above actions are repeated for each of the load sensors.

In this manner, the method can detect particularly a failure of the seat load measuring apparatus, deterioration with age, and a failure in installation for exchanging seats.

Figure 6:
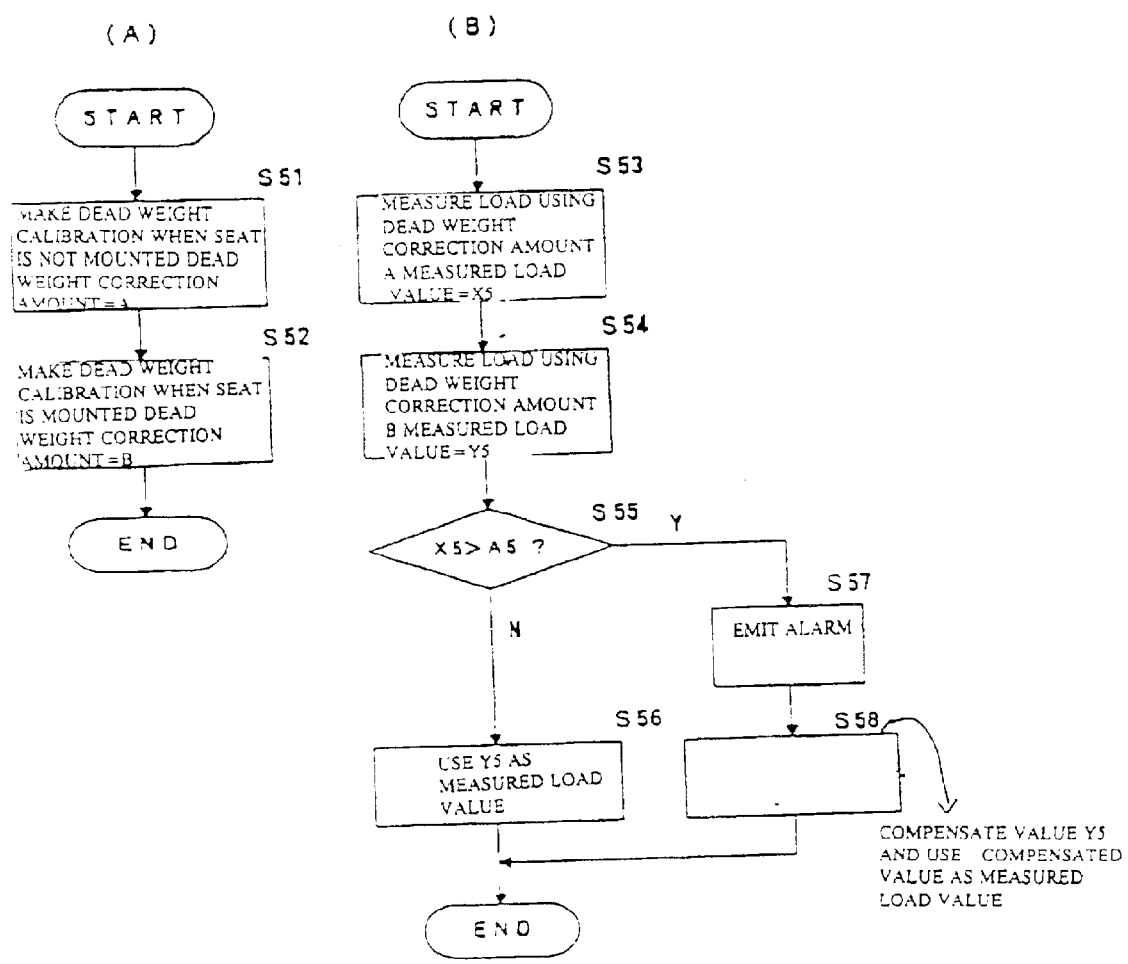
FIGS. 6(A), 6(B) are flow charts showing a diagnostic method as a fifth embodiment of the present invention.
Figure 7:
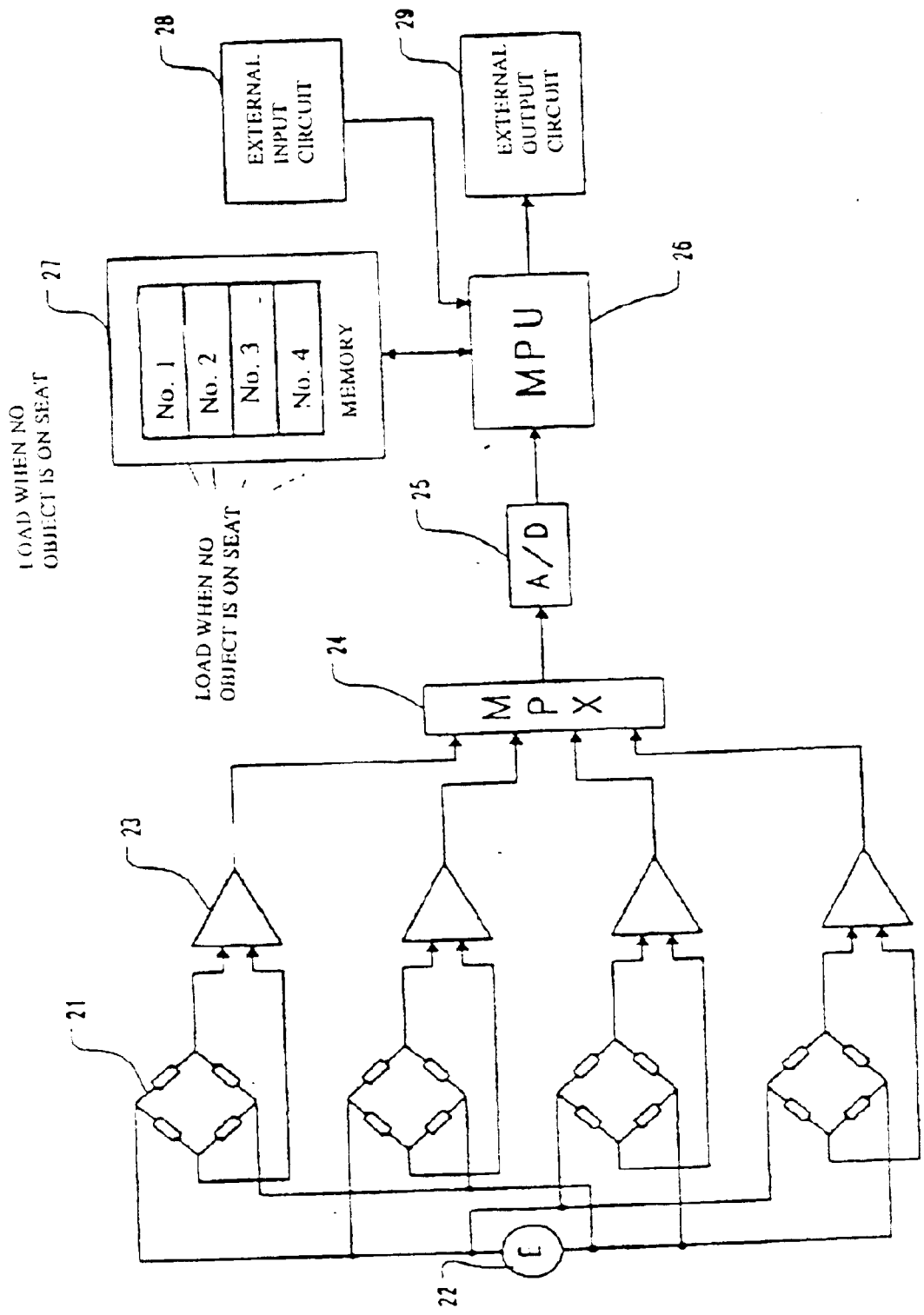
FIG. 7 is a schematic diagram showing the construction of a conventional seat load measuring apparatus.

FIGS. 6(A), 6(B) are flow charts showing a diagnosis method as a fifth embodiment of the present invention. FIG. 6(A) shows actions to be made before the sale of the vehicle and FIG. 6(B) shows actions to be made after the sale of the vehicle. During the assembly of the vehicle, at a step S51, the initial dead weight calibration is made in the state in which the seat is not mounted according to a command from the external input circuit 8 to obtain a dead weight correction amount A which is stored in the memory. At a step S52, the initial dead weight calibration is made in the state in which the seat is mounted to obtain a dead weight correction amount B which is stored in the memory.

After the sale of the vehicle, at a step S53, a load measurement is conducted using the dead weight correction amount A. A load value measured at this step is assumed as X5. Then, at a step S54, a load measurement is conducted using the dead weight correction amount B. A load value measured at this step is assumed as Y5. At a step S55, it is judged whether the value X5 exceeds a predetermined value A5. If so, it is determined that the load exceeds the measurable range of the load sensors 1R, 1L and an alarm indicating abnormality is emitted to inform a person that the measured value can not be relied on at a step S57. At a step S58, the measured value Y5 is corrected by using a preset correction amount which is previously determined by measurement and the corrected value is used as a measured load value.

When the value X5 does not exceed the predetermined value A5, it is determined that the load is normally measured. Therefore, the process proceeds to a step S56 for the normal routine. The measured value Y5 is used as the measured load value for various controls.

Though the processes according to the first, second, third and fourth embodiments are performed by automatic sequences in the above description, the entire or a part of the processes may be manually performed. In this case, when the abnormality can be judged by a person, the alarm is not necessary. In the fifth embodiment, the sequence shown by FIG. 6(A) may be manually performed.

When the sensitivity calibration of the load sensors are performed by using source voltages supplied for the respective load sensor, the source voltages may be used as information from the seat load measuring apparatus in the inventions.

Some pieces of information for detecting an abnormality are explained separately in the above description, these pieces of information may be used in combination for judgement of an abnormality.

As described above, in an aspect of this invention, a comparison is made between information from a seat load measuring apparatus in a state in which a vehicle seat is not mounted on load sensors and information from the seat load measuring apparatus in a state in which the vehicle seat is mounted on the load sensors, thereby detecting abnormality of the seat load measuring apparatus.

In a second aspect, a comparison is made between respective pieces of information from seat load measuring portions corresponding to the respective load sensors when the load sensors are assembled in seat portions, thereby detecting abnormality of the seat load measuring apparatus.

In a third aspect, a comparison is made between information from the seat load measuring apparatus in a state in which the vehicle seat is mounted on the load sensors but before installation to the vehicle body and information from the seat load measuring apparatus after the installation in the vehicle, thereby detecting abnormality of the seat load measuring apparatus.

In a fourth aspect, a comparison is made between respective pieces of information from seat load measuring portions corresponding to the respective load sensors when seat portions with the load sensors are installed to a vehicle body, thereby detecting abnormality of the seat load measuring apparatus.

In a fifth aspect, a comparison is made between information from the seat load measuring apparatus in a state in which no load is applied to the load sensors and information from the seat load measuring apparatus in a state in which a predetermined load is applied to the load sensors, thereby detecting abnormality of the seat load measuring apparatus.

In a sixth aspect of the present invention, a comparison is made between information from the seat load measuring apparatus in a state in which no load is applied to the vehicle seat and information from the seat load measuring apparatus in a state in which a predetermined load is applied to the vehicle seat, thereby detecting abnormality of the seat load measuring apparatus.

In a seventh aspect, a comparison is made between a sensitivity of the seat load measuring apparatus before the vehicle seat is mounted on the load sensors and a sensitivity of the seat load measuring apparatus after the vehicle seat is mounted on the load sensors, thereby detecting abnormality of the seat load measuring apparatus.

In an eighth aspect of the present invention, at least an output of the amplifier is used as the information from the seat load measuring apparatus, thereby enabling accurate detection for abnormality of the seat load measuring apparatus.

In a ninth aspect of the present invention, at least an output of a dead weight calibrating portion is used as the information from said seat load weight measuring apparatus, thereby enabling accurate detection for abnormality of the seat load measuring apparatus.

In a tenth aspect of the present invention, an initial dead weight calibration is made in a state in which the seat is mounted on the load sensors, a correction amount for this calibration is stored as an initial correction amount, and a dead weight correction amount for another dead weight calibration is compared with the initial dead weight correction amount for every dead weight calibration, thereby detecting deterioration with age of the seat load measuring apparatus.

In an aspect according to claim 11, an initial dead weight calibration is made in a state in which the seat is not mounted on the load sensors, a correction amount for this calibration is stored as an initial correction amount, and a dead weight correction amount for another dead weight calibration is compared with the initial dead weight correction amount for every dead weight calibration, thereby detecting deterioration with age of the seat load measuring apparatus in the same manner as the tenth aspect.

In a twelfth aspect, dead weight calibration is made in a state in which the seat is mounted on the load sensors, an output of the seat load measuring apparatus is stored as an initial value, and, after that, the initial value is compared with an output of the seat load measuring sensor measured when no object is on the seat, thereby detecting deterioration with age of the seat load measuring apparatus in the same manner as in the tenth and eleventh aspects.

In a thirteenth aspect, a dead weight correction amount for dead weight calibration in a state in which the seat is not mounted on the load sensors is used for monitoring the outputs of the load sensors, thereby detecting when the load exceeds the measurable range of the load sensors.

In a fourteenth aspect, a dead weight correction amount for dead weight calibration in a state in which a predetermined load is applied to the seat is used for monitoring the outputs of the load sensors, thereby detecting when the load exceeds the measurable range of the load sensors.

In a fifteenth aspect, a sensitivity correction for initial sensitivity calibration is stored and the sensitivity correction amount is compared with a sensitivity correction amount for another sensitivity calibration made after the initial sensitivity calibration, thereby detecting deterioration with age in the sensitivity of the seat load measuring apparatus.

The above description and drawings are illustrative only because modifications could be made without departing from the present invention, the scope of which is to be limited only by the following claims.

The priority document here, Japanese Application No. H11-29781, filed Feb. 8, 1999 (including its specification, drawings, and claims), is hereby incorporated by reference into this application.

What is claimed is:

1. A diagnostic method for a seat load measuring apparatus for measuring the load applied on a vehicle seat, wherein the seat load measuring apparatus comprises a plurality of load sensors for detecting the weight of the vehicle seat and the weight of an object on the vehicle seat and a plurality of amplifiers for amplifying signals from the load sensors, the diagnostic method comprising the steps of comparing information from the load sensors, and thereby judging whether the seat load measuring apparatus functions normally.

2. A diagnostic method for a seat load measuring apparatus for measuring the load applied on a vehicle seat, wherein the seat load measuring apparatus comprises a plurality of load sensors for detecting the weight of the vehicle seat and the weight of an object on the vehicle seat and a plurality of amplifiers for amplifying signals from the load sensors, the diagnostic method comprising the steps of comparing information from the load sensors when the load sensors are installed in a vehicle body, and thereby judging whether the seat load measuring apparatus functions normally.

3. A diagnostic method for a seat load measuring apparatus for measuring the load applied on a vehicle seat, wherein the seat load measuring apparatus comprises load sensors for detecting the weight of the vehicle seat and the weight of an object on the vehicle seat and an amplifier for amplifying signals from the load sensors, the diagnostic method comprising the steps of comparing information from the seat load measuring apparatus in a state in which no load is applied to the load sensors to information from the seat load measuring apparatus in a state in which a predetermined load is applied to the load sensors, and thereby judging whether the seat load measuring apparatus functions normally.

4. A diagnostic method for a seat load measuring apparatus for measuring the load applied on a vehicle seat, wherein the seat load measuring apparatus comprises load sensors for detecting the weight of the vehicle seat and the weight of an object on the vehicle seat and an amplifier for amplifying signals from the load sensors, the diagnostic method comprising the steps of comparing information from the seat load measuring apparatus in a state in which no load is applied to the vehicle seat to information from the seat load measuring apparatus in a state in which a predetermined load is applied to the vehicle seat, and thereby judging whether the seat load measuring apparatus functions normally.

5. A diagnostic method for a seat load measuring apparatus for measuring the load applied on a vehicle seat, wherein the seat load measuring apparatus comprises load sensors for detecting the weight of the vehicle seat and the weight of an object on the vehicle seat, an amplifier for amplifying signals from the load sensors, and a dead weight calibrating portion, the diagnostic method comprising the steps of making an initial dead weight calibration in a state in which the seat is mounted on the load sensors, storing a correction amount for this calibration as an initial correction amount, comparing the initial correction amount to a correction amount for another dead weight calibration made after the initial dead weight calibration, and thereby judging whether the seat load measuring apparatus functions normally.

6. A diagnostic method for a seat load measuring apparatus for measuring the load applied on a vehicle seat, wherein the seat load measuring apparatus comprises load sensors for detecting the weight of the vehicle seat and the weight of an object on the vehicle seat, an amplifier for amplifying signals from the load sensors, and a dead weight calibrating portion, the diagnostic method comprising the steps of making a dead weight calibration in a state in which the seat is mounted on the load sensors, storing an output of the seat load measuring apparatus as an initial value, comparing the initial value to an output of the seat load measuring apparatus measured when no object is on the seat, and thereby judging whether the seat load measuring apparatus functions normally.

7. A diagnostic method for a seat load measuring apparatus for measuring the load applied on a vehicle seat, wherein the seat load measuring apparatus comprises load sensors for detecting the weight of the vehicle seat and the weight of an object on the vehicle seat, an amplifier for amplifying signals from the load sensors, and a sensitivity calibrating portion for the load sensors, the diagnostic method comprising the steps of making an initial sensitivity calibration, storing a sensitivity correction amount for this calibration, comparing the sensitivity correction amount to a sensitivity correction amount for another sensitivity calibration made after the initial sensitivity calibration, and thereby judging whether the seat load measuring apparatus functions normally.

* * * * *